May 18, 1965 E. R. SPEAKMAN 3,183,548
DUAL PINTLE FLUSH MOUNTING HINGE
Filed Sept. 24, 1962
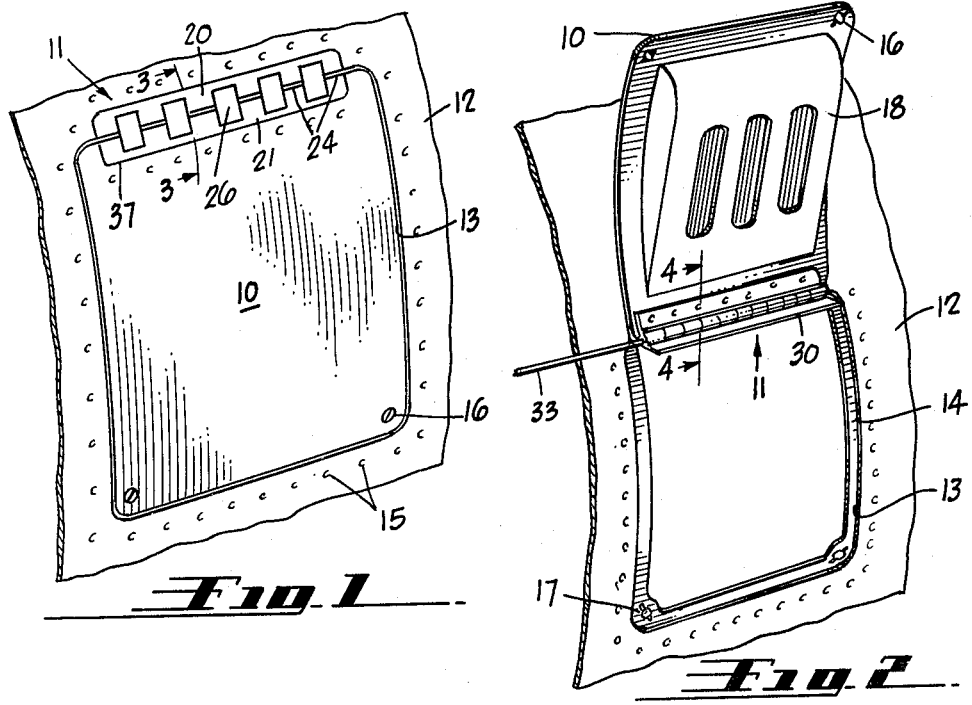
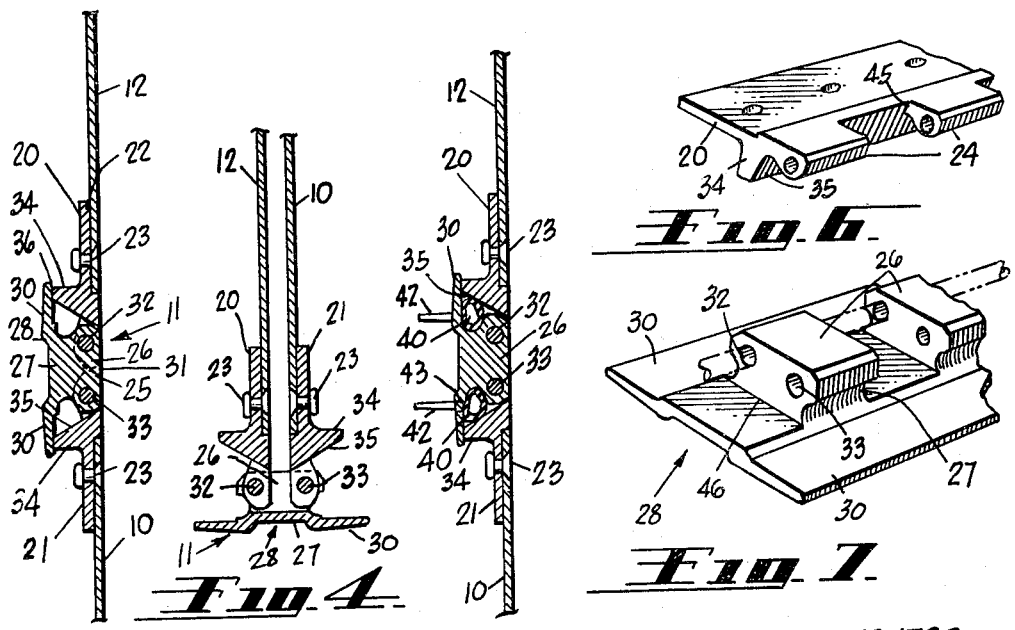
INVENTOR
EUGENE R. SPEAKMAN
BY
AGENT United States Patent Office 3,183,548
Patented May 18, 1965

3,183,548
DUAL PINTLE FLUSH MOUNTING HINGE
Eugene R. Speakman, Fullerton, Calif., assignor to Douglas Aircraft Company, Inc., Santa Monica, Calif.
Filed Sept. 24, 1962, Ser. No. 225,785
4 Claims. (Cl. 16—163)

The present invention relates generally to hinges and relates more particularly to dual pintle type hinges for permitting at least 180° movement of and flush mounting relative to a hinged member and a stationary member. The hinge of this invention is adapted primarily for use in connection with aircraft structures, access doors and other covers for openings which may be required or necessary for maintenance or service of an aircraft or access to compartments thereof.

The art of hinges, of a great variety of types, is extremely old, such structures being provided to enable relative movement between two elements, such as doors, associated walls and the like. However, when prior known hinges are applied to use with aircraft, a number of special problems are presented relating to the configuration of the exterior of a hinge and the conformity thereof to exterior surfaces of the aircraft, as well as to structural strength characteristics thereof.

Further, aircraft operating authorities contemporarily require that access doors, to various internal compartments of the aircraft, be fully replaceable in the event of damage thereto. This safety measure assists in insuring operation of the aircraft with full integrity of all components and particularly the access doors to compartments. In still further instances, the hinges employed with aircraft access doors and the like must necessarily be of a depth relative to the surface of the aircraft as not to interfere with internal structures and thus permit use in limited space areas while the door is both in a closed or an open position. In other instances, it has been common that access doors to aircraft compartments have suffered damage by tools used by mechanics, accidental bumping or pressure by the mechanics, movement of scaffolds, and the like. Protrusion of open doors from the surface of the aircraft have also caused injury to aircraft operating personnel and mechanics, inasmuch as hinges used heretofore have not enabled opening of a door in a manner to permit the normally outer face of the door to lie in close proximity to the skin of the aircraft. In other words, most prior hinge structures have caused or required that access doors protrude substantially normal to the exterior of the aircraft, thus being extremely vulnerable to damage and creating a hazard to workmen who must pass the locale of the door.

More specifically, for efficient operation of aircraft, all exterior surfaces thereof must be as smooth and uninterrupted as possible. Substantial lengths have been acceded to toward the end of producing the desirable smooth, uninterrupted surfaces, as by countersinking rivet heads and suitably fairing one element into another. In the case of hinges for the described access doors, extreme difficulty has been encountered in providing hinges that will enable the desirable full 180° movement of the hinged member, permit easy removal of hinge pins to enable replacement of a door, provide sealing about the hinge elements of compartments covered by the access door and still present a relatively uninterrupted exterior surface. In this connection, it is also extremely desirable that the passage of air about portions of the hinge be reduced to a minimum, or completely eliminated, not only to protect articles within a compartment covered by an access door, but also to improve and maintain the aerodynamic conditions surrounding the aircraft and those surfaces thereof defined by access doors.

Accordingly, it is one important object of the present invention to provide a hinge structure for use primarily in connection with access doors of aircraft and having features of novelty overcoming the disadvantages of prior known hinges intended for similar purposes.

It is another important object of the present invention to provide a hinge structure enabling at least 180° movement of a hinged member relative to a fixed member.

It is still another object of the invention to provide a hinge structure for use with access doors for compartments of aircraft, including means to enable replacement of the access door without the necessity for disassembly of other components surrounding the hinge or for use of such structures as split hinge pins.

It is still another important object of the present invention to provide a hinge structure including means associated therewith for sealing the hinge with regard to passage of air about elements thereof.

A further important object of the present invention is to provide a hinge structure of the dual pintle type and including means for preventing passage of air about the hinge elements, while retaining a minimum height with respect to an exterior surface of the hinge.

A still further object of the invention is to provide a hinge strucuture adapted primarily for use on panels or doors defining an exterior surface of the aircraft and having physical characteristics presenting a relatively smooth and uninterrupted exterior surface configuration.

Another object of the invention is to provide a hinge structure that may be manufactured from easily fabricated extrusions with a minimum of time and effort, to produce a hinge that is economical, reliable, efficient in operation, and which may be easily installed in connection with a hinged member.

In accordance with one aspect of the present invention, the hinge hereof comprises a pair of substantially identical extrusions that are notched in a particular manner for cooperation with a third extrusion that is also cooperatively notched. The extrusions are interconnected by means of a pair of unitary hinge pins that extend the length thereof. Additionally, the pair of extrusions each have integral portions that cooperate with the third extrusion in a direction causing a slight wiping action therebetween, to provide the desired sealing against passage of air about elements of the hinge. The particular configuration of the hinge elements permits disposition of relatively movable portions of the elements in a manner substantially completely to close normally existing joints therebetween and to present the desired relatively smooth exterior surface.

In accordance with another aspect of the invention, the present hinge lends itself particularly to the use of elongated resilient sealing members which cooperate with the extruded hinge elements to provide substantially a hermetic seal against passage of air thereabout. All of the structures associated with the present hinge are such, and the sealing points are arranged, to provide structural integrity across the hinge, as well as the described sealing characteristics, while maintaining the height of the hinge at a minimum to eliminate interference with structures that must be disposed adjacent interior surfaces of the hinge.

Other and further important objects, advantages and aspects of the invention will become apparent from the disclosures in the following detailed specification, appended claims and accompanying drawing, wherein:

FIGURE 1 is a fragmentary perspective view of a portion of an aircraft surface and an access door hingedly connected thereto;

FIG. 2 is a perspective view similar to FIG. 1 showing the access door in an open position;

FIG. 3 is an enlarged fragmentary sectional view through the hinge of the present invention showing elements thereof and the access door attached thereto in a closed position and taken substantially as indicated by line 3—3, FIG. 1;

FIG. 4 is a sectional view similar to FIG. 3, showing the access door in an open position and taken substantially as indicated by line 4—4, FIG. 2;

FIG. 5 is a sectional view similar to FIG. 3, showing a modified form of the present invention, including resilient sealing members for the hinge;

FIG. 6 is a fragmentary perspective view showing the method of making one of the elements of the hinge from an extrusion; and FIG. 7 is a fragmentary perspective view showing the method of making another of the hinge members from an extrusion.

With reference to the drawing, wherein like elements and portions are indicated by like reference numerals, and referring primarily to FIGS. 1 and 2, an access door 10 is illustrated as attached, by means of the hinge 11 of the present invention, to a surrounding structure indicated generally at 12. The access door 10 is suitably contoured to conform to the desired contour of the exterior of the structure 12 and is disposed within and adapted to close an opening 13 in the structure 12. A backing or stop flange 14 is also provided about the inner periphery of the opening 13 and attached to the interior surface of the structure 12 as by a plurality of fastening members such as rivets 15. The door 10 is further selectively secured in a closed position by means of suitable fasteners 16 which cooperate with openings 17 in corners of the flange 14 remote from the hinge 11. Accordingly, with the material of the door 10 being of a thickness substantially equivalent to the thickness of the surrounding structure 12, when the interior surface of the door 10 is disposed in engagement with the flange 14, the outer surface of the door 10 will be coextensive with the surrounding surfaces of the structure 12, whereby to provide a smooth, substantially uninterrupted and contoured surface. It is to be noted that the hinge structure 11 of the present invention is of the type enabling 180° movement of the door 10 relative to the structure 12, whereby to dispose the door, when in an open position, as indicated in FIG. 2. It is to be noted that the exterior surface of the door 10 may rest against the exterior of the structure 12. As shown further in FIG. 2, the door 10 may be provided with suitable stiffening elements 18 on the interior surface thereof. It is to be understood that any desired type of securing means, straps, catches or the like may also be employed with the door 10 to maintain the door temporarily in the open position.

The access door 10, and the opening 13 covered thereby, is intended to provide access to a compartment covered by the structure 12, which may be a luggage or cargo compartment, the interior of engine nacelles or other similar areas for which access openings are used to enable service or maintenance of the aircraft or stowage of articles therein. In order to maintain proper contour of the exterior of the aircraft and to reduce the over-all size of covering structures thereof, it is important that the hinge 11 occupy as little space as possible in a direction extending into the compartment defined by the structure 12. The hinge of the present invention enables such utilization in connection with the indicated limited space areas.

With reference primarily to FIGS. 3 and 4, the hinge 11 comprises a pair of substantially identical elongated hinge members 20 and 21. The hinge 11 and members thereof are of a length sufficient to extend substantially the length of one edge of the door 10. Each of the members 20 and 21 is provided with a shoulder 22 of a depth substantially equal to the thickness of the material of the door 10 and the surrounding structure 12, whereby to permit attachment of the members 20 and 21 to the structure 12 and door 10 respectively, as by rivets 23.

The members 20 and 21 further include integral lug portions 24 that have ends thereof that are generally elliptically rounded as at 25. The edges 25 thus present a relatively sharp corner at the junction of the rounded portion and the outermost surfaces of the elements 20 and 21. The lug portions 24 are laterally spaced and adapted for cooperation with a plurality of lug portions 26 that are formed in an integral riser portion 27 of a movable hinge member 28. For purposes to be hereinafter more fully described, the movable hinge member 28 has laterally extending portions 30. The riser portion 27 of the member 28 is suitably curved as at 31 on each lateral side thereof and slotted for reception of the portions 24 of the members 20 and 21. Each lateral side of the riser portion 28, as well as the portions 24, are provided with longitudinally extended openings for reception respectively of one of a pair of hinge pins 32 and 33.

As shown primarily in FIG. 2, it is to be noted that the arrangement of the hinge pins 32 and 33 is such that, when the access door 11 is in open position, the hinge pin 33 is moved to a position to lie exterior to the outer surface of the surrounding structure 12. This particular arrangement enables the hinge pin 33 to be removed easily, whereby to permit removal of the access door 11 and replacement thereof, if desired or necessary. It is also to be noted that the construction is such that when the access door 11 is closed, both of the hinge pins 32 and 33 lie beneath the exterior surface of the structure 12, with the ends thereof abutting edges of the opening in the structure 12, thus to retain the pins in position and to prevent any inadvertent removal or loss thereof.

In order to provide sealing against passage of air about portions of the hinge 11, the hinge members 20 and 21 are each provided with an elongated sealing portion 34 that extends integrally therefrom in a direction away from exterior surfaces of the door 10 and the surrounding structure 12. The portions 34 each have an inner edge 35 that is beveled with respect to the portions 20 and 21 and is coextensive with a bottom of each of the slots defined beween the lugs 24, whereby to dispose the outer edges of these slots as closely adjacent to the rounded edges 31 of the riser 27 as possible. The portions 34 thus present relatively thin elongated edges 36 that are adapted for engagement and cooperation with the portions 30 of the hinge member 28. In other words, the edges 36 engage complementary surfaces of the portions 30 and the location thereof, at distances substantially remote from axes of the hinge pins 32 and 33 provides a slight wiping action (rather than mere abutting) between these edges and the surfaces of the portions 30. This structure serves thus to provide a sealing action against passage of air about elements of the hinge and into the compartment normally closed by the access door. The edges 36 are positioned to engage and to preload the surfaces of the portions 30, slightly before the periphery of door 10 engages the stop 14 to insure adequate longitudinal contact, the described wiping action and appropriate sealing action.

With reference primarily to FIG. 4, it is to be noted that the hinge 11 permits movement of the door 10 through at least 180° and that the member 28 freely moves to the position indicated when the door is in an open position. Alternatively, the door 10 may be opened to any desired angle up to the fully open position with ease while, when in a closed position, the described sealing will be accomplished. Additionally, it is to be noted that substantial structural integrity is gained across the hinge when in the closed position due to the engagement of the portions 34 of the members 20 and 21 with the portions 30 of the member 28. The fact of this engagement thus provides the dual function of sealing and structural rigidity, the location of the edges 36 at remote points from the axes of the pins 32 and 33 further enhancing these dual functions.

It is also to be noted that the relatively sharp complementary edges of each of the lugs 24 present only a slight depression along the line of the hinge when in a closed position. Additionally, the bevelled bottoms of each of the notches between the lugs 24 serve to conform closely with the outer curved surfaces of the riser 27 thus also to present only minute openings to disturb the relatively smooth exterior surface of the hinge and surrounding structure. Inasmuch as the riser has a flat upper surface and the upper surfaces of the members 20 and 21 are also flat with shouldered portions 22, substantially flat total surfaces of the hinge 11 are presented and are coextensive with surrounding surfaces of both the door 10 and the structure 12. As shown in FIG. 1, ends of the members 20 and 21 are installed slightly inwardly from lateral edges of the door 10 and may be suitably rounded as at 37 to eliminate sharp corners which might otherwise cause a point of weakness in the material of the door 10 or structure 12.

With reference to the form of the invention illustrated in FIG. 5, it is to be noted that this form of the hinge includes all of the characteristics, features and functions of the hinge illustrated in FIGS. 3 and 4. Accordingly, like reference numerals are used to indicate the same or identical components of the hinge. In this particular form of the invention, a pair of hollow, elongated and resilient sealing members, indicated at 40, are disposed in a space defined between each lateral side of the riser portion 27 and the laterally extending portions 30 of the hinge member 28. This space is further defined by the laterally disposed surface 35 of the elongated sealing portions 34. For retention of the sealing members 40 in position, these sealing members are provided with a plurality of spaced, integral, laterally extending tabs 42 that are disposed through openings 43 in the laterally extending portions 30 of the hinge member 28. The tabs 42 have a diameter slightly greater than the diameter of the openings 43 and the resiliency thereof serves to retain the sealing members 40 in position. As shown in FIG. 5, the sealing members 40 are slightly compressed when the access door 10 is closed to provide substantially a hermetic seal against passage of air about the hinge elements or portions and into any compartment covered by the access door utilizing the present hinge.

Hermetic sealing across the hinge of the present invention may also be accomplished in particular instances through use of a highly viscous sealing compound that may be applied to the surface of the laterally extending portions 30 engaged by the elongated sealing members 34. This sealing compound may be of any desired type, such as that normally used in calking operations and the like, and is engaged and plastically deformed by the edges 36 of the portions 34. To assist in separation of the portions 34 and 30, the edges 36 and adjacent areas of the elongated portions 34 may be coated with a suitable parting agent, which may be in the form of a highly viscous grease or the like, depending upon the type and characteristic of employed sealing compound.

The particular resilient sealing members and methods discussed hereinbefore and disclosed in FIG. 5 may be used in specific situations where absolute sealing against passage of air or liquid across the hinge is desired. However, in most instances, these sealing members are not required, inasmuch as the sealing portions 34 and the relatively thin elongated edges 36 thereof cooperate adequately with the surfaces of the portions 30 to provide substantially complete and effective sealing. It is also to be noted that use of the sealing members 40 provides the specific complete seal across the hinge, without disturbing the structural integrity of the hinge, the sealing provided between the portions 30 and 34 or the smooth and substantially uninterrupted exterior surface configuration of the hinge.

With reference to FIGS. 6 and 7, it is to be noted that the major hinge elements 20 and 28 may be easily and inexpensively constructed from extruded material, with the spaces between the lug portions 24 of the members 20 and the spaces between the lug portions 26 of the member 28 being easily provided by a straight lateral milling or broaching operation across the extrusions. The milling cutter may also be suitably rounded on corners thereof to provide a rounded junction as at 45 at the base of each of the lugs 24 and as at 46 at the base of each of the lugs 26. The cooperative portions and edges of the lugs 24 and 26 are also suitably rounded. This serves to eliminate sharp corners while further providing the desired smooth and substantially uninterrupted exterior surface of the hinge.

It may thus be seen that the hinge of the present invention presents the desired characteristics to accomplish the objects set forth hereinbefore and may be used particularly in aircraft applications, not only to provide the desired hinging characteristics but also to dispose one pivot pin outwardly from a surface of surrounding structure whereby to permit easy removal and replacement of an access panel or door when desired or necessary. The particular sealing characteristic against passage of air through the hinge, as well as the structural integrity provided thereby, and the relatively smooth exterior surface all cooperate toward the desired end results and accomplishment of said objects.

Having thus described the invention and the present embodiments thereof, it is desired to emphasize the fact that many further modifications may be resorted to in a manner limited only by a just interpretation of the following claims.

I claim:

1. A hinge for pivotally connecting a movable object to a fixed structure, said hinge comprising, in combination:
   a pair of substantially identical first hinge members individually adapted for attachment respectively to said movable object and to said fixed structure;
   at least one pair of spaced lugs disposed integrally from each of said first hinge members;
   a second hinge member;
   at least a single riser disposed integrally from said second hinge member and adapted for disposition intermediate said pair of spaced lugs of each of said first hinge members, said lugs and said riser having a pair of spaced aligned openings therethrough;
   elongated hinge pins disposed in each of said aligned openings and having axes lying in a common plane;
   an elongated sealing portion disposed integrally from each of said first hinge members, said sealing portions extending substantially parallel to said hinge pins and positioned remotely outwardly therefrom; and
   laterally extending portions disposed integrally from said second hinge member and in a plane substantially parallel to said plane containing said axes of said pins, said sealing portions contacting surfaces of said laterally extending portions only when a surface of said movable object is positioned substantially coextensive with a complementary surface of said fixed structure to provide a seal against passage of air through said hinge.

2. A hinge for pivotally connecting a movable object to a fixed structure, said hinge comprising, in combination:
   a pair of substantially identical first hinge members individually adapted respectively for attachment to said movable object and to said fixed structure;
   at least one pair of spaced lugs disposed integrally from each of said first hinge members;
   a second hinge member;
   at least a single riser disposed integrally from said second hinge member and adapted for disposition intermediate said pair of spaced lugs of each of said first hinge members, said lugs and said riser having a pair of spaced aligned openings therethrough;

elongated hinge pins disposed in each of said aligned openings and having axes lying in a common plane;

an elongated sealing portion disposed integrally from each of said first hinge members, said sealing portions extending substantially parallel to said hinge pins and positioned remotely outwardly therefrom;

laterally extending portions disposed integrally from said second hinge member and in a plane substantially parallel to said plane containing said axes of said pins, said sealing portions contacting surfaces of said laterally extending portions only when a surface of said movable object is positioned substantially coextensive with a complementary surface of said fixed structure to provide a seal against passage of air through said hinge; and a resilient sealing member disposed between each of said elongated sealing portions and lateral sides of said riser, said resilient sealing members being individually carried by each of said laterally extending portions.

3. A hinge for pivotally connecting a movable object to a fixed structure, said hinge comprising, in combination:

first and second elongated hinge members;

alternately interdisposed lugs integrally disposed from each of said hinge members, said first hinge members comprising a pair of elongated hinge members individually adapted for attachment to said movable object and to said fixed structure, said lugs having a pair of spaced aligned openings therethrough;

elongated hinge pins disposed in each of said aligned openings and having axes lying in a common plane;

an elongated sealing portion disposed integrally from each of said first hinge members, said sealing portion extending substantially parallel to said hinge pins and positioned remotely outwardly therefrom; and laterally extending portions disposed integrally from said second hinge member and in a plane substantially parallel to said plane containing said axes of said pins, said sealing portions contacting surfaces of said laterally extending portions only when a surface of said movable object is positioned substantially coextensive with a complementary surface of said fixed structure to provide a seal against passage of air through said hinge.

4. A hinge for pivotally connecting a movable object to a fixed structure, said hinge comprising, in combination:

first and second elongated hinge members;

alternately interdisposed lugs integrally disposed from each of said hinge members, said first hinge members comprising a pair of elongated hinge members individually adapted for attachment to said movable object and to said fixed structure, said lugs having a pair of spaced aligned openings therethrough;

elongated hinge pins disposed in each of said aligned openings and having axes lying in a common plane;

an elongated sealing portion disposed integrally from each of said first hinge members, said sealing portion extending substantially parallel to said hinge pins and positioned remotely outwardly therefrom;

laterally extending portions disposed integrally from said second hinge member and in a plane substantially parallel to said plane containing said axes of said pins, said sealing portions contacting surfaces of said laterally extending portions only when a surface of said movable object is positioned substantially coextensive with a complementary surface of said fixed structure to provide a seal against passage of air through said hinge; and a resilient sealing member carried by said second hinge member and disposed between each of said elongated sealing positions and lateral sides of said second hinge member.

References Cited by the Examiner

UNITED STATES PATENTS

| | | | |
|---|---|---|---|
| 809,137 | 1/06 | Saling | 16—165 |
| 828,649 | 8/06 | Greenawalt | 16—165 |
| 1,622,451 | 3/27 | Kroschel | 16—163 |
| 1,919,392 | 7/33 | Reinhardt | 189—46 |
| 2,307,560 | 1/43 | Apel | 16—165 X |
| 2,440,817 | 5/48 | Benson | 16—165 |
| 2,783,860 | 3/57 | Taubman | 189—46 |
| 3,065,496 | 11/62 | Loughlin | 16—135 |

M. HENSON WOOD, Jr., *Primary Examiner.*

DONLEY J. STOCKING, *Examiner.*